US006637120B2

United States Patent
Pustay

(10) Patent No.: US 6,637,120 B2
(45) Date of Patent: Oct. 28, 2003

(54) EXTENDABLE LEVEL

(76) Inventor: Joseph Pustay, P.O. Box 767, Pinckney, MI (US) 48169

( * ) Notice: Subject to any disclaimer, the term of this patent is extended or adjusted under 35 U.S.C. 154(b) by 0 days.

(21) Appl. No.: 10/051,365

(22) Filed: Jan. 18, 2002

(65) Prior Publication Data

US 2002/0121026 A1 Sep. 5, 2002

Related U.S. Application Data

(60) Provisional application No. 60/262,452, filed on Jan. 18, 2001.

(51) Int. Cl.$^7$ ................................................ G01C 9/26
(52) U.S. Cl. ........................................................ 33/374
(58) Field of Search ........................... 33/374, 296, 809, 33/384, 464

(56) References Cited

U.S. PATENT DOCUMENTS

| | | | | |
|---|---|---|---|---|
| 4,130,943 A | * | 12/1978 | Talbot | 33/374 |
| 4,607,437 A | * | 8/1986 | McSorley et al. | 33/374 |
| 4,733,475 A | * | 3/1988 | Youmans | 33/374 |
| 4,928,395 A | * | 5/1990 | Good | 33/374 |
| 5,249,365 A | * | 10/1993 | Santiago | 33/374 |
| 5,642,569 A | * | 7/1997 | Palmer | 33/809 |
| 6,041,510 A | * | 3/2000 | Huff | 33/374 |
| 6,047,478 A | * | 4/2000 | Sowers | 33/374 |
| 6,167,631 B1 | * | 1/2001 | Lin | 33/374 |
| 6,293,023 B1 | * | 9/2001 | Schooley | 33/374 |

* cited by examiner

Primary Examiner—G. Bradley Bennett
(74) Attorney, Agent, or Firm—James M. Deimen

(57) ABSTRACT

A new level having a very rigid and rugged construction in the form of solid blocks between four track members that guide the relative movement of the level frame and level extension. The track members and extension provide planar surfaces the length of the extended level on the top and bottom. The extension includes handgrips to assist in both extending and using the level. As an option, a rotatable spirit vial is located in the extension. The rotatable spirit vial may be set for any angular degree between the horizontal and the vertical. Thus, angular pitches may be accurately determined with as much ease as the horizontal or vertical.

4 Claims, 2 Drawing Sheets

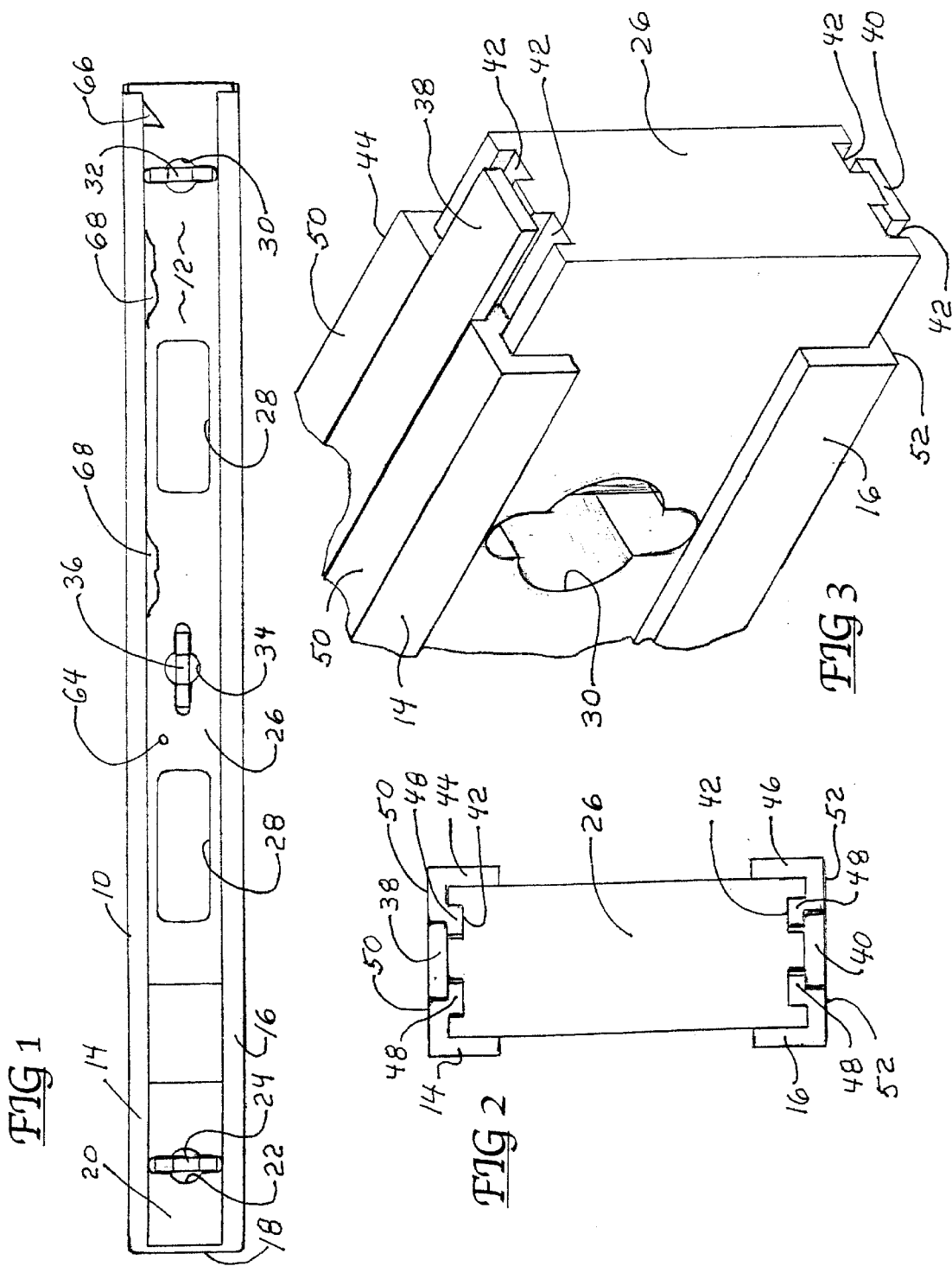

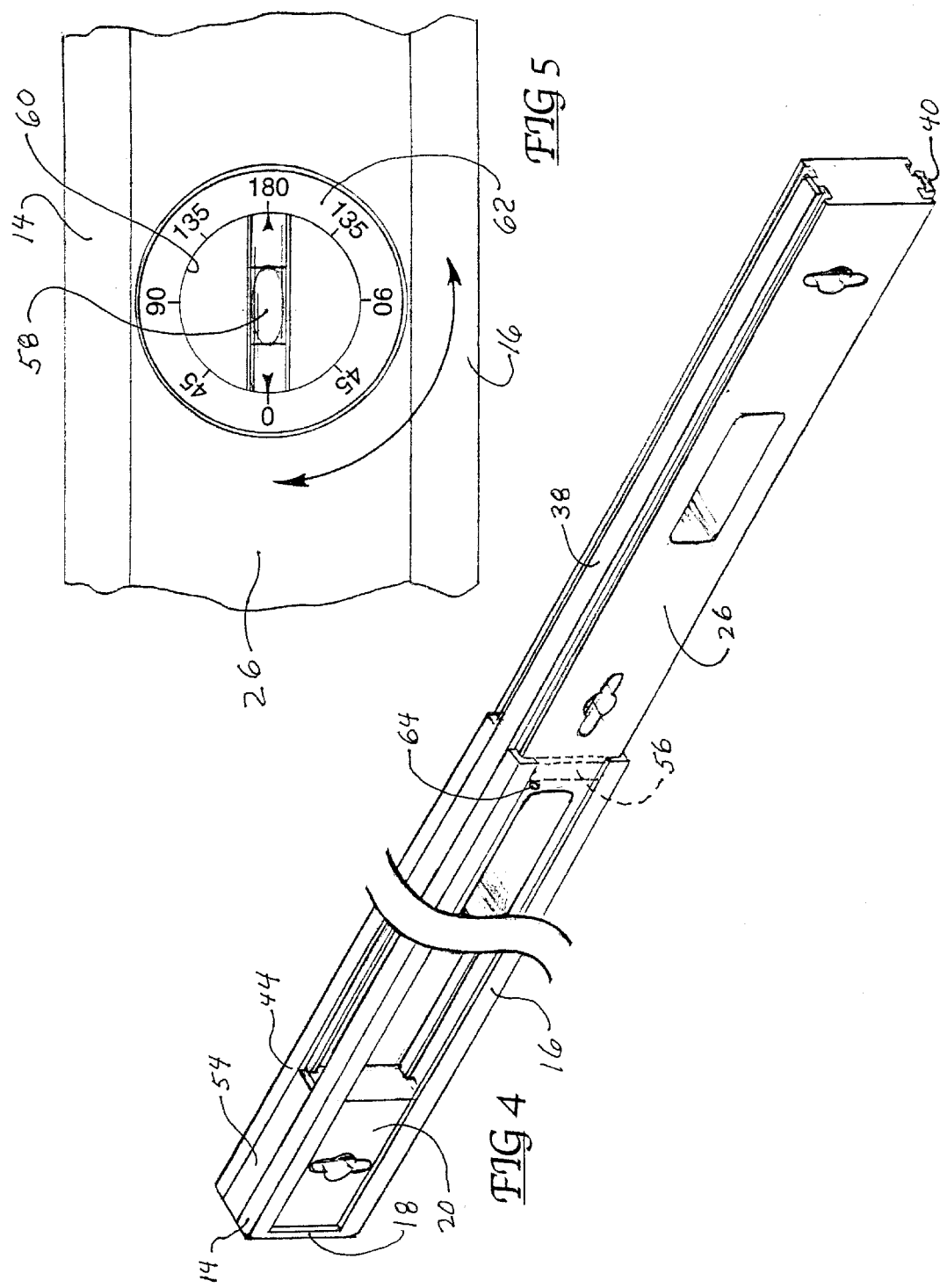

EXTENDABLE LEVEL

This application claims the benefit of provisional patent application No. 60/262,452, filed Jan. 18, 2001.

BACKGROUND OF THE INVENTION

The field of the invention pertains to bubble levels used by stone masons, bricklayers, carpenters and other tradesmen in the construction trades. In particular, the invention pertains to solidly constructed levels that will retain their accuracy under constant use in wet, dusty and dirty environments and where the level may also be accidentally dropped.

Tradesmen typically have several levels of various lengths. To lessen the need for several separate levels, extendable or telescopeable levels have been developed. U.S. Pat. No. 4,130,945 discloses an extension level wherein extension members carrying spirit level vials overlap on a central base member having a leveling vial therein.

U.S. Pat. No. 4,894,925 discloses an extendable level of generally open web construction and stops to prevent over-extension. The level provides for a planar relationship between the level edges.

U.S. Pat. No. 5,577,327 discloses a central portion having a horizontal spirit vial and end portions with vertical spirit vials. The end portions telescope on rods extending from the central portion.

U.S. Pat. No. 6,041,510 discloses a three-piece level wherein two side pieces slide on a central body to provide more than doubling of the fully collapsed length.

SUMMARY OF THE INVENTION

The new level provides for a very rigid and rugged construction in the form of solid blocks between four track members that guide the relative movement of the level frame and level extension. The track members and extension provide planar surfaces the length of the extended level on the top and bottom. The major parts of the level are exceptionally simple in configuration and in ease of assembly, thus providing for very inexpensive manufacture.

The extension includes handgrips to assist in both extending and using the level. As an option, a rotatable spirit vial is located in the extension. The rotatable spirit vial may be set for any angular degree between the horizontal and the vertical. Thus, angular pitches may be accurately determined with as much ease as the horizontal or vertical.

BRIEF DESCRIPTION OF THE DRAWINGS

FIG. 1 is a side view of the new extendable level;

FIG. 2 is an end view of the new level;

FIG. 3 is a broken-away end view perspective of the new level slightly extended;

FIG. 4 is a perspective view of the level as extended; and

FIG. 5 is a detail of a rotatable spirit bubble option for the new level.

DESCRIPTION OF THE PREFERRED EMBODIMENTS

Illustrated in FIG. 1 is the level frame 10 and level extension 12 in unextended position. The frame 10 comprises metal track members 14 and 16 which are permanently joined by an end piece 18 welded to the track members. A solid block 20 is rigidly fitted into the track members 14 and 16 and abuts the end piece 18 to form a very rigid construction. A small aperture 22 through the block 20 is fitted with a spirit vial 24.

The level extension 12 comprises a solid piece 26 having a pair of large apertures 28 for gripping the level. A second small aperture 30 in the solid piece 26 is fitted with a spirit vial 32 parallel with spirit vial 24. A third small aperture 34 in solid piece 26 is fitted with a spirit vial 36 that is accurately perpendicular to spirit vials 24 and 32. The location of spirit vial 36 is preferably centered between the unextended length of the level.

As best shown in FIGS. 2 and 3, the solid piece 26 is fitted with or otherwise formed with top 38 and bottom 40 plates that extend the length of solid piece 26. Simple rectangular channels 42 are formed in solid piece 26 adjacent each side of each plate 38 and 40. The rectangular channels 42 form undercuts with plates 38 and 40 along the length of the solid piece 26. Metal track members 14 and 16 have mirror image counterparts 44 and 46 and are generally "J" shaped to provide elements 48 which fit in the rectangular channels 42. The metal track members 14, 16, 44 and 46, the channels 42 and plates 38 and 40 are all carefully formed to provide sliding engagement without play. The accurate sliding engagement keeps debris from jamming the engagement and retains the outside surfaces of plates 38 and 40 planar with the parallel outside track member surfaces 50 and 52, respectively. Thus, from unextended to fully extended as shown in FIG. 4, the upper and lower limiting surfaces of the level remain planar. In addition, short plates 54 are affixed to, or formed as a part of, block 20 and are planar with metal track surfaces 50 and 52.

As shown, the various parts of the new extendable level are relatively simple in cross-sectional shape, there being only three simple cross-sectional shapes for the six major parts of the level. As a result, the tooling cost and assembly cost for the new level is substantially reduced in comparison with other extendable levels. The level is also exceptionally rugged and therefore particularly suitable for masonry use.

As an option to provide maximum accurate extension and rigidity, braces 56 in dashed outline can be welded between metal tracks 14 and 16 and between 44 and 46, respectively, on each side of the level as shown in FIG. 4.

As a second option, the center spirit vial 36 and aperture 34 may be replaced by a rotatable spirit vial 58 in a larger aperture 60 as shown in FIG. 5. The spirit vial 58 is mounted for selectable rotation to a desired degree of slope on the scale 62 about the aperture 60. Thus, the extendable level can be conveniently used for setting sloping form work and other more complicated masonry and carpentry applications.

Other options that may be added to the extendable level include a maximum stop to prevent over-extension of the level and detent stops at common intervals. For example, a pin 64 may extend from the solid piece 26 for engagement with the optional brace 56 as shown in FIG. 4 or with a stop 66 attached to metal track 14 as shown in FIG. 1. Detents 68 may also be attached to metal track 14 as shown in FIG. 1 for engagement with pin 64.

What is claimed is:

1. An extendable level comprising a frame and an extension in telescopic engagement with the frame, the frame including a plurality of track members and a block permanently affixed to the track members and the extension including a solid piece and a plurality of plates affixed to the solid piece, said solid piece being substantially wider than said plates, a plurality of parallel channels formed in the solid piece adjacent and beyond the plates, said channels extending beneath at least portions of said plates, and said track members shaped to partially fit into said channels and over the solid piece with portions of said track members extending beneath portions of said plates.

2. The extendable level of claim 1 including a first aperture formed in the block, the aperture being fitted with a first spirit vial.

3. The extendable level of claim 1 including a second aperture formed in the solid piece, the second aperture being fitted with a second spirit vial, and a third aperture formed in the solid piece, the third aperture being fitted with a third spirit vial in a direction perpendicular to the second spirit vial.

4. The extendable level of claim 1 wherein each plate is located between two track members, the outer surface of each plate being coincident with a plane formed by adjacent outer surfaces of adjacent track members.

* * * * *